３,475,638
LUMINESCENT DEVICES
Frank T. King, Sheffield, England, assignor to Owens-Illinois, Inc., a corporation of Ohio
Filed Dec. 15, 1964, Ser. No. 418,458
Int. Cl. H01j 29/22; C09k 1/04
U.S. Cl. 313—92                               20 Claims

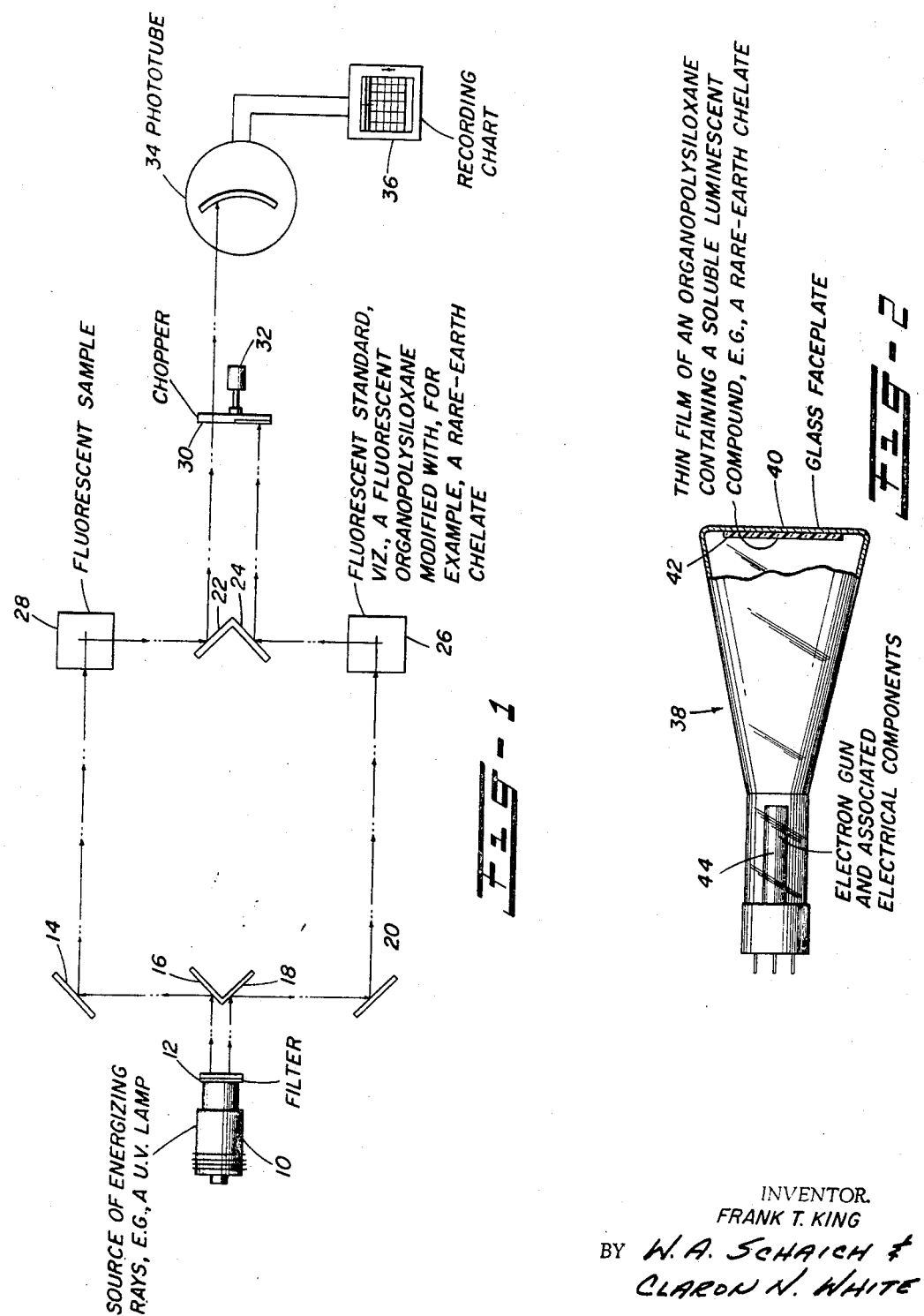

ABSTRACT OF THE DISCLOSURE

Luminescent devices such as screens and cathode-ray tubes having a face plate which is coated with an organopolysiloxane condensation product having incorporated therein a rare-earth chelate.

---

This invention relates broadly to luminescent devices or apparatus. More particularly it is concerned with luminescent devices, e.g., photoluminescent devices, having a source of energizing rays, e.g., ultraviolet rays, and a target for conversion of such rays to luminescent emission. This target comprises, broadly defined, a composition comprising an organopolysiloxane having incorporated therein a soluble organometallic substance, more particularly a rare-earth chelate, capable of luminescence upon bombardment with electrons. The rare-earth chelate or other organometallic substance employed is effective in imparting luminescent (including potentially luminescent) properties to the organopolysiloxane, more particularly cured organopolysiloxane, composition.

In one preferred embodiment of the invention the organopolysiloxane comprises or consists essentially of the siloxane condensation product of hydrolyzable silane including at least one compound represented by the general formula I         $T_n SiZ_{(4-n)}$ wherein each T independently represents a member of the group consisting of alkyl, alkenyl and aryl radicals having less than 7 carbon atoms, each Z independently represents a hydrolyzable group, and $n$ represents a positive integer less than 4.

It will be understood, of course, by those skilled in the art that some or all of the Z's in Formula I can also represent an —OH group. Hence, the term "hydrolyzable" as used herein and in the appended claims is intended to include within its meaning compounds wherein the hydrolyzable group or groups have already been hydrolyzed to an —OH group or groups, unless it is clear from the context that the more limited meaning is intended. The terms "hydrolysis" product and "condensation" product as used in the preceding paragraph and elsewhere in this specification, and in the appended claims, are intended to include within their meaning the co-hydrolysis and co-condensation products that result when mixtures of silicon-containing starting reactants are employed.

In another preferred embodiment of the invention the modifier of the organopolysiloxane, which is preferably one embraced by Formula I, is a rare-earth chelate of a ketone represented by the general formula II        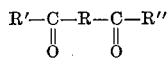

wherein R represents a divalent aliphatic hydrocarbon radical having from 1 to 3 carbon atoms, inclusive, R' represents a monovalent radical selected from the group consisting of monovalent hydrocarbon, halohydrocarbon, oxyhydrocarbon and thiohydrocarbon radicals having from 1 to 12 carbon atoms, inclusive, R" has the same meaning as R' and, in addition, a hydrogen atom.

The oxyhydrocarbon and thiohydrocarbon radicals referred to in the above definitions of R' and R" in Formula II are radicals wherein the carbon atoms of, for example, a hydrocarbon chain (linear or ring chain) are interrupted by one or more ether (—O—) atoms or by one or more thioether (—S—) atoms.

Most present commercial luminescent devices use targets composed of polycrystalline phosphors prepared by sintering powdered inorganic reactants selected to provide the necessary host and activator components. The resulting aggregates are ground or otherwise comminuted to a particle size of about one to twenty microns, and then deposited on a substrate. Organic materials are often used as binders to obtain more uniform phosphor deposition, or as membrane coating for the phosphor to provide a surface that can be aluminized. Several disadvantages attend these processes: comminution adversely affects luminescent efficiency ot the phosphors; the phosphors' inherent sensitivity to deterioration by chemical attack is enhanced by their large surface/volume ratio when powdered; uniform contact among phosphor particles and with the substrate is difficult to achieve, and inadequate contact causes light scattering which decreases effective output. Furthermore, phosphor coatings have little abrasion resistance, and binders used in their preparation are subject to thermal deterioration; and, of course, product fabrication techniques are limited to those that do not adversely affect the sensitive phosphor screens. Also, the target is usually opaque, and consequently resolution and definition of a projected image are relatively poor.

[The terms "luminescence" (noun) and "luminescent" (adjective), as used in this specification and/or in the appended claims, are employed according to their ordinary dictionary definition; "luminescence-device" or "luminescent device" means or refers to any apparatus or contrivance by which radiation is converted to luminescent emission; and "target" means the material, regardless of its shape or form, in a luminescent device that effects this conversion.]

Much research and development effort has been expended in recent decades on organopolysiloxanes, and compositions are known that are useful, for example, as lubricants, laminating media, protective films, flexible and rigid moldings, and for other purposes. However, to the best of my knowledge and belief, it was not known prior to this invention to provide targets comprising luminescent (including potentially luminescent) organopolysiloxane materials in fluid, semi-solid or solid form.

The present invention is based on my discovery that luminescent devices and apparatus embodying the same can be made by utilizing as a target for a source of energizing rays an organopolysiloxane that has been modified as broadly described in the first paragraph of this specification and more fully hereafter. Specifically I have found that the organopolysiloxane compositions comprising an organopolysiloxane modified with a metallic chelate, more particularly a rare earth-metal chelate, such as those organopolysiloxane compositions disclosed and claimed in the copending application of Charles W. Newing, Jr., Ser. No. 418,531 now U.S. Patent 3,367,910, and assigned to the same assignee as the present invention, are eminently and unobviously suitable for use as components of such devices. Such compositions, in accordance with the present invention, are utilized in manufacturing, for example, an electronic image-forming device including a tube, e.g., a cathode-ray tube, having a face plate at least a portion of the inner surface of which is surfaced, specifically coated, with an organopolysiloxane composition of the kind referred to in the forepart of this paragraph.

It is accordingly a primary object of the present invention to provide new and improved luminescent devices wherein are utilized novel targets that may be in liquid, semi-solid or solid form but which preferably are in solid form.

Another object of the invention is to provide an electronic image-forming device including a tube having a face plate at least a portion, usually a major portion, of the inner surface of which is surfaced with a composition comprising an organopolysiloxane having incorporated therein a soluble organometallic substance (more particularly a metallic chelate and still more particularly a rare-earth chelate), capable of luminescence upon bombardment with electrons.

Still another object of the invention is to provide a cathode-ray tube at least a portion of the inner surface of which is coated with a thin film of an organopolysiloxane having a rare-earth chelate incorporated therein.

A further object of the invention is to provide a cathode-ray tube having a face plate at least a portion of the surface of which is coated with a thin film of a composition comprising an organopolysiloxane having a rare-earth chelate incorporated therein, the said film being capable of luminescent emission under the influence of energizing rays; and means for supplying energizing rays to said film.

Another object of the invention is to provide a process for generating luminescent emission which comprises causing energizing radiation to impinge on a target capable of luminescent emission under the influence of energizing rays and comprising an organopolysiloxane having incorporated therein a rare-earth chelate.

Still other objects of the invention will be apparent to those skilled in the art from the following description and the accompanying drawing.

The novel features of the invention are set forth in the appended claims. The invention itself, however, will best be understood from reference to the following more detailed description and the accompanying drawing wherein:

FIGURE 1 illustrates schematically a luminescent device of the present invention, more particularly a fluorometer; and FIGURE 2 illustrates schematically another type of luminescent device of the instant invention, more particularly an electronic tube and still more particularly a cathode-ray tube.

The objects of the invention are attained by utilizing, in a luminescent device, a modified organopolysiloxane composition of the kind described herein and in the aforementioned copending Newing, Jr., application Ser. No. 418,531 now U.S. Patent No. 3,367,910, filed concurrently herewith.

The luminescent devices, or apparatus embodying the same, of the instant invention overcome many of the disadvantages of the prior-art structures which were briefly described and their disadvantages set forth in the fifth paragraph of this specification. This is because there is employed a target comprised or consisting essentially of a luminescent, modified, organopolysiloxane resin of the kind hereinbefore briefly described. Such resins not only can be made in liquid, semi-solid or solid form as previously has been indicated, but they also can be produced in different opacities (transparent, translucent or opaque) to meet the requirements of a particular service application. As liquid, luminescent targets they can be adapted to any convenient shape, or they can be used in a flowing system. As solid targets, they can be cast into a variety of shapes from thin films to bulk articles, e.g., articles that are several inches thick. The concentration of the luminescent component can be readily varied over a wide range, as will be evident from certain parts of the following more detailed description.

It is well established that some rare earths have the ability to absorb radiation (at particular frequencies) and emit this radiation at other distinct frequencies. It can be demonstrated that the efficiency of this energy transfer is quite dependent upon the environment surrounding the central rare-earth atom. One method of changing this environment is to surround this central atom with oxygen-donating chelating agents such as acetylacetone, thenoyltrifluoroacetone, etc. These chelating groups or structures appear to absorb this excitation radiation and transfer it to the central metal atom. The efficiency of this transfer is related to the ability of the ligand to perform this absorption and energy transfer. Due to the size and electronic structure of this rare-earth atom, it can accommodate three of these surrounding chelate groups. This is to say, it exhibits a maximum covalency of six: three primary bonds and three bonds due to coordination of the oxygen atom on the chelate to the central metal atom. It has been shown that these rare-earth central atoms can exhibit eight and possibly as much as twelve coordination.

In the targets used in practicing this invention, the matrix, i.e., the organopolysiloxane resin, evidently coacts with the rare-earth chelate to provide unobvious results that in no way could have been predicted. For example, when terbium thenoyltrifluoroacetonate, $Tb(TTA)_3$, is incorporated into an organopolysiloxane, and coatings and moldings are prepared therefrom, the cured coatings and moldings are hard, transparent and quite fluorescent (green) at room temperature (20°–30° C.). In marked contrast the organopolysiloxane employed in the test is non-fluorescent at room temperature and $Tb(TTA)_3$ itself is fluorescent only at very low temperatures of the order of −196° C. This is strongly indicative that the matrix coacts with the rare-earth chelate to provide the unobvious action. It may be that either solid solution of the chelate in the matrix occurs or that the chelate becomes bound in the resin in the form of a chemical complex that has properties (including luminescent characteristics) different from either the organopolysiloxane resinous matrix or the rare-earth chelate incorporated therein. Or, the organopolysiloxane, particularly when the preferred organopolysiloxane is employed, otherwise aids in absorbing the external radiation (e.g., U.V. light) and transfers it to the central rare-earth metal atom.

Many and various practical techniques can be employed for taking advantage of the foregoing discovery and whereby fluorescence in the visible light and/or under ultraviolet (U.V.) light and/or cathodoluminescence is imparted to the target comprising an organopolysiloxane resin modified with a rare-earth chelate. For example, the solid, machinable, thermosetting organopolysiloaxne resins or structures disclosed and claimed in copending application Ser. No. 306,344, now abandoned, of Alfred J. Burzynski and Robert E. Martin, and assigned to the same assignee as the present invention, may be modified by incorporating therein a rare-earth chelate, more particularly a rare-earth chelate of a ketone of the kind embraced by Formula II. By such modification means are provided for producing clear (if desired) and relatively thick, machinable bodies or structures of preselected dimensions having the aforementioned luminescent properties and which also are free from interior deformations or voids. Such a unique combination of properties was heretofore unknown in the organopolysiloxane art.

The luminescent, modified, organopolysiloxane materials or compositions used in practicing this invention can be produced in fluid, specifically liquid, in semi-solid or, as stated in the preceding paragraph, in solid form. They are useful in producing the luminescent devices of this invention including, for instance, fluorescent lights, radiation-detection devices and radar screens; luminous markers, signs, dials such as those on automotive and airplane panel boards; and others such as those more fully described hereafter.

In accordance with one embodiment of the present invention there is utilized a modified organosiloxane, the unmodified form of which comprises or consists essentially of the siloxane condensation product of hydrolyzable silane including at least one compound embraced by Formula I.

Illustrative examples of groups represented by Z in Formula I include, for example, halogen (chlorine, bromine, fluorine and iodine), alkoxy (e.g., methoxy through heptoxy), and acyloxy (e.g., acetoxy, propionoxy, butyroxy, pentanoxy, hexanoxy, etc.), and aryloxy, e.g., phenoxy. In particular, alkoxy groups are preferred because their hydrolysis products are less acidic, and therefore control of the rate of siloxane condensation is simpler. Alkoxy groups of less than 5 carbon atoms are especially advantageous (and are preferred) for the radical represented by Z in Formula I, because the rate of hydrolysis can be inconveniently slow when the organic hydrolyzable radical(s) have a higher molecular weight (i.e., more carbon atoms).

Illustrative examples of radicals represented by T in Formula I are alkyl, e.g., methyl, ethyl and propyl through hexyl (both normal and isomeric forms), cyclopentyl, cyclohexyl, vinyl and the normal and isomeric forms of propenyl through hexenyl, and phenyl.

More specific examples of compounds embraced by Formula I are given hereinafter with respect to compounds within the scope of Formulas III and IV given later herein.

Monomeric starting materials of the Formula $T_nSiZ_{(4-n)}$ can be prepared by a variety of procedures known to the art.

The means selected to effect hydrolysis of the starting materials and condensation of the resultant silanols is dependent primarily upon the physical characteristics desired in the product. When liquids or films are to be prepared, hydrolysis and condensation can be carried out simply by contacting the monomer or mixture of monomers with water. Usually, however, one or more conditions designed to increase speed or homogeneity of reaction, such as stirring, elevated temperatures, addition of acid or base, use of an added solvent, are used. Viscosity of the final product can be regulated by controlling the time of reaction, use of catalysts, concentration of reactants, rate of evaporation, and similar variables. The particular manner in which control of these variables will be attained will depend on the particular circumstances, and can be determined by routine experimentation according to procedures generally well known to those skilled in the art.

Preparation of unmodified organopolysiloxane

In general, the preparation of the unmodified organopolysiloxane comprises heating a hydrolyzable silane including at least one compound embraced by Formula I with from 1.5 to 10 moles of water for each mole of the total molar amount of the hydrolyzable silane(s). Heating is continued for at least one hour and up to about 10 hours or more at a temperature of at least about 50° C. while retaining at least about 1.5 moles of hydroxy-containing by-products in the reaction mass per mole of silicon-containing starting material, assuming complete hydrolysis of all the hydroxyhydrocarbyl-silicon linkages in the said reaction mass. Thereafter the temperature of the reaction mass is gradually raised to a final temperature of from about 100° C. to about 300° C. while gradually removing by volatilization alkanol and/or phenolic by-products and some water. This occurs over a time interval of at least 5 minutes. Thereafter, condensation and heating are continued in the aforesaid temperature range of from 100°–300° C. for a period short of gel or solid formation within the said temperature range.

Suitable experimentally-determined variations of the time and temperature parameters of the process involved in making the organopolysiloxanes would probably allow use of, for example, alkoxysilanes containing a higher number of carbon atoms in an alkoxy chain. However, in general, the longer hydrolysis time required by alkoxy radicals of longer chain-length makes them, ordinarily, undesirable for use.

As has been indicated hereinbefore, the concentration of water in the initial hydrolysis-condensation reaction mixture advantageously is at least about 1.5 moles, more particularly from about 1.5 moles to about 10 moles of water, per mole of the total amount of hydrolyzable silane reactant(s). Organopolysiloxane resins can be prepared at the aforementioned lower concentration of water, but further decrease in the water content of the reaction mass ordinarily leads to the production of polymers that are rubbery and soft, presumably due to incomplete hydrolysis and condensation. If the quantity of water is in the range of from about 1.5 moles to about 5 moles of water per mole of the hydrolyzable silane(s), the hydroxy-containing by-products, e.g., alkanols or phenol, formed during hydrolysis, act as a solvent for the other products and reactants, as a result of which the initially heterogeneous reaction mass becomes clear and homogeneous. This homogeneity is desirable, since it prevents resin precipitation and allows more uniform control of resin formation.

If the ratio of water to hydrolyzable silane(s) substantially exceeds 5:1, the resulting amount of by-product hydrolysis products, such as alkanols or phenol, is insufficient to convert the aqueous medium to a solvent for the reactants and the reaction products, and resin precipitation can occur. Insolubility of resinous products at higher water concentrations can be overcome by adding a water-miscible organic solvent, e.g., ethanol, isopropanol, or any other organic solvent for the polymer having water-miscibility characteristics. However, at water-concentrations above about 10 moles of water per mole of hydrolyzable silicon-containing monomer, gel formation may occur even if sufficient organic solvent is added to make the reaction mass homogeneous. The exact upper limit of the ratio of water to hydrolyzable silicon-containing monomeric material is dependent upon such influencing factors as, for example, the particular hydrolyzable silicon-containing material employed, the pH and temperature of the reaction mass, time of reaction, etc. Hence the upper limit cannot be set forth precisely, but can be determined by routine test in each case. The limits within which no addition of organic solvent is required, viz., from about 1.5 moles to about 5.0 moles of water per mole of hydrolyzable silicon-containing monomer, are preferred.

At pressures near one atmosphere, temperatures in the range of from about 50° C. to the reflux temperature of the reaction mass are useful. Temperatures much below this range require substantially longer times for reaction, and thus obviate a particularly advantageous aspect of the resin-making process, namely, its relatively high speed of operation. Also, no particular improvement in properties is attained by the use of such lower temperatures. In general, temperatures at or near the reflux temperature of the reaction mass are preferred, especially when refluxing occurs at from about 70° C. to about 90° C. Under the concentration and temperature conditions hereinbefore described, the initial hydrolysis and condensation are complete in from about 1 to about 10 hours, depending upon the particular materials and conditions used, and generally within from about 2 to 3 hours.

It is preferred that some of the hydrolysis by-products, such as alkanols or phenol, be retained in the reaction mass during the initial hydrolysis and condensation. It is believed that the presence of such hydroxy-containing by-products slows, by mass action, the overall rate of hydrolysis-condensation. This control of the rate of resin formation prevents gel formation and makes possible the preparation of homogeneous, rare-earth chelate-modified, highly cross-linked polymers having good dimensional stability. If the concentration of hydrolysis by-products is allowed to fall substantially below 1.5 moles thereof per mole of the hydrolyzable silicon-containing monomeric material (assuming that complete hydrolysis takes place), gel formation occurs. This limit can vary slightly with the particular materials and conditions employed.

After initial hydrolysis and condensation under the conditions just described, controlled volatilization of the hydrolysis by-products, e.g., alkanols and phenol, and water, is effected while the reaction mass is heated to from about 100° C. to about 300° C. This relatively high (i.e., above 100° C.) temperature step is herein designated as the "precure" step.

The purpose of precure is to effect controlled removal of volatiles while the siloxane condensation reaction continues at a convenient rate, but which is nevertheless slowly enough to avoid gel formation. In general, the highest possible precure temperature is preferred, since this provides greatest impetus to siloxane formation and volatilization of the hydrolysis by-products, and makes possible the shortest time required to effect final cure at a lower temperature.

The temperature to which a particular reaction mass can be heated during precure without causing gelation thereof depends, for example, upon the particular materials used and their prior treatment, but the limit can be readily established by heating an aliquot to gelation and keeping the precure temperature of the main batch slightly below this gelation point. The precure time is similarly dependent upon several variables. At a precure temperature above 100° C. it is, in general, at least about 5 minutes, although the time at the highest temperatures attained can be merely momentary.

To avoid gelation and to effect polysiloxane formation at a conveniently rapid rate, the acidity of the initial hydrolysis-condensation reaction mass advantageously is maintained within certain limits hereinafter set forth in detail. Commercial hydrolyzable silicon-containing compounds (silanes) of the kind embraced by Formula I, such as commercial alkoxysilanes, usually contain a quantity of acid or base that exceeds the relatively narrow limits permissible in the initial reaction mixture employed in practicing a preferred embodiment of the instant invention. Impure monomers can be used in the hydrolysis reaction mixture, followed by addition of acid or base to adjust the pH to the required level. However, the large amount of salts that are formed impair desirable properties, especially transparency, of the final products. Salts, particularly those of variable-valence cations, may also act as catalysts for siloxane formation. It is, therefore, preferable to adjust the pH of the monomer or mixture of monomers before preparing the reaction mixture. Simple distillation is unsuitable because it increases the acidity of the monomeric material, probably by oxidation of some organic groups to acidic or potentially acidic functions such as carboxylic acids, esters, aldehydes and/or ketones. Use of a nitrogen atmosphere is insufficient to prevent this acidity increase, apparently because the system itself contains oxidizing species. Reduction of acid content can be carried out by adding bases such as metal hydroxides or amines, but the salts that are formed are objectionable impurities in the final products.

A preferred technique for preparing the monomeric material is by distillation of an admixture of the monomer with a reagent that will convert acidic species therein to nonvolatile compounds, for instance as disclosed in the copending application of Burzynski and Martin, Ser. No. 370,684, now abandoned, which is assigned to the same assignee as the present invention.

Initial hydrolysis-condensation is conveniently carried out by charging to a reaction vessel pure water and a hydrolyzable silane of the kind embraced by Formula I. The initially cloudy reaction mixture clears on heating, usually within an hour, because the hydroxyhydrocarbon by-product, specifically alcohol, dissolves the other components of the mixture. A suitable degree of hydrolysis-condensation is usually obtained if reflux is allowed to proceed for from about 1 to 4 hours after the mixture clears. This step can be carried out at lower temperatures, but the rate is substantailly slower.

The upper limit of permissible acid content during this initial hydrolysis-condensation is that beyond which gel formation occurs. The lower limit is determined by the desired reaction time. In general, the minimum reaction time to obtain satisfactory products is usually about 1 hour under reflux. Maximum and minimum allowable acid contents vary with the ratio of hydrolyzable silane(s) and water used. The lower theoretical water content is $Z/2$, where $Z$ is the average number of hydrolyzable groups attached to silicon throughout the reaction mass. Thus when the hydrolyzable silane is, for example, a methyltrialkoxysilane as the sole silane constituent, the theoretical lower molar ratio of hydrolyzable silane:water is 1:1.5. At this molar ratio, the acid content is generally controlled within the range of from about 50 to about 650 parts (or higher in some cases) of HCl per million parts of hydrolyzable silane. When the hydrolyzable silane: water molar ratio is 1:3.0, the minimum acid content is about zero part of HCl per million parts of the hydrolyzable silane and the maximum is about 5 parts on this same basis.

The aforementioned limits are necessarily subject to minor variation in each case. First, polymer formation by its nature will not proceed identically in any two runs, and the particular mode of polymerization can alter slightly the acid sensitivity of the system. Second, use of other hydrolyzable silanes in certain amounts as comonomers can reduce acid sensitivity, but the effect will generally be small. Third, extremely small quantities of impurities in a given sample, impractical to remove, can alter acid sensitivity slightly. These factors, however, affect only the maximal and minimal extremes of acid content, and the major portion of the suitable area indicated will be unchanged.

It is usually most convenient to reduce the acid content of the monomer(s) to about zero part by weight of HCl per million parts of monomer(s) by suitable acid-removal technique and, if necessary, then adjust the acidity of the initial reaction mixture by adding acid to the water used. Although generally any acidic material soluble in the reaction mass can be used, organic acids such as phenol and formic acid are particularly suitable because they retard subsequent oxidation of the reactants.

The reaction mass obtained from the initial hydrolysis-condensation reaction is concentrated by removing volatile components, conveniently by distillation from the vessel containing the said mass. All of the solvents should not be removed or the resin will have a pronounced tendency to gel. Usually, removal of about 80 mole percent of the hydroxyhydrocarbon by-product, e.g., an alkanol, gives a residue convenient to manipulate further by the particular means herein described. The concentrate thus obtained is next heated to a temperature above the boiling point of pure water at the prevailing pressure for a specified time, conveniently while stirring in an open vessel. The time and temperature of this precure step are determined by the particular composition used, but in general a temperature of 110° to 300° C. at ambient pressure and a period up to about 30 minutes are typical. The elimination of water and other volatile materials from the reaction mass at this point presumably leads to further linear polymerization and cross-linking, and the mass becomes increasingly viscous.

If the precure step is omitted from the process, the resins cast from the liquid, rare-earth chelate-modified organopolysiloxane crack severly during the final curing step. Such cracked resins can be pulverized, e.g., to 300-mesh particle size and finer, and the finely divided luminescent resin used as a filler in paints and molding compositions (e.g., urea- and melamine-formaldehyde resins, methyl methacrylate and other acrylate polymers, polystyrene, etc.), and in making other filled compositions and articles from any of the available unfilled or partly filled natural resins, thermoplastic and thermosetting resins and plastics, and the like.

Production of solid, luminescent, machinable, thermosetting resins or structures As has been indicated hereinbefore, the present invention can be practiced by modifying the solid, machinable, thermosetting organopolysiloxane resins or structures disclosed and claimed in the aforementioned Burzynski and Martin copending application Ser. No. 306,344. The disclosure of this application and of the aforementioned Burzynski and Martin copending application Ser. No. 370,684, are by this cross-reference made a part of the disclosure of the instant invention, both of which are assigned to the same assignee as the present invention.

The invention of Burzynski et al. application Ser. No. 370,684 is directed to a method of preparing a solid resin by (a) heating reactant(s) consisting of a methyltrialkoxysilane of the formula:

III

and 0 to 10 mole percent, preferably not more than 5 mole percent, based on total silane reactant(s), of at least one compound of the formula IV

wherein each T independently represents a monovalent radical selected from the group consisting of aryl, alkyl (including cycloalkyl), and alkenyl radicals, each of which contains less than 7 carbon atoms, and the alkoxy radical, RO—, wherein R represents an alkyl radical of less than 4 carbon atoms, and from 1.5 to 10 moles of water per mole of silane, for at least one hour and up to ten hours at temperatures of at least 50° C. while retaining at least 1.5 moles of alkanol by-products in said mixture per mole of silane starting material assuming complete hydrolysis of all alkoxy-silicon linkages in said mixture, and (b) gradually raising the temperature of the resulting mixture to a final temperature of from 100° to 300° C. while gradually removing by volatilization alkanol by-products and some water, over a time interval of at least 5 minutes, and continuing condensation and heating in the range of 100° to 300° C. for a time short of solid or gel formation in said temperature range.

Methyltrialkoxysilanes used in practicing the invention of the aforementioned Ser. No. 370,684 are those of the formula $CH_3Si(OR)_3$ where each R represents an alkyl radical with less than 4 (i.e., 1 to 3) carbon atoms. Included are methyltrimethoxysilane, methyltriethoxysilane, methyltri-n-propoxysilane, and methyltriisopropoxysilane, as well as compounds with mixed alkoxy groups. Examples of co-reactants embraced by Formula IV (and also by Formula I, supra) include trimethylmethoxysilane, tri(1-methylethyl)ethoxysilane, di(1-methylpropyl) diethoxysilane, divinyldipropoxysilane, diphenyldiethoxysilane, propylpentylmethoxysilane, methylallyldi(1-methylethoxy)silane, vinylphenyldimethoxysilane, ethyltriethoxysilane, (1-methylethyl)-trimethoxysilane, (1,1-dimethylethyl)tripropoxysilane, hexyltriethoxysilane, and vinyltriethoxysilane.

Comonomers embraced by Formula I and also by Formula IV, if employed, can be used to modify the properties of the resins according to principles known generally to the art. Thus, comonomers containing 3 or 4 alkoxy groups act as cross-linking agents; those with 2 alkoxy groups act to increase chain length and decrease cross-linking; and those with one alkoxy group act as chain-terminating agents. In particular, inclusion of dialkoxysilanes such as dimethyldiethoxysilane can be used to diminish cross-linking and thus provide less brittle products. Inclusion of more than about 5 mole percent of alkyl orthosilicates can lead to excessive cross-linking and attendant brittleness, and quantities of other comonomers substantially above this amount may cause decreased chemical resistance.

In this embodiment, too, the concentration of water in the initial hydrolysis-condensation reaction mixture should be in the range of from about 1.5 moles to about 10 moles of water per mole of silane reactants. Likewise, the other remarks made hereinbeforewith respect to resin precipitation and avoidance thereof apply to the production of a solid, machinable polysiloxane, as do also the remarks made with regard to the temperature and pressure of the reaction, and the retention of hydrolysis products (e.g., an alkanol) in the reaction mass during hydrolysis and initial condensation.

Initial hydrolysis-condensation is conveniently carried out by placing in a flask pure water, methyltrialkoxysilane, the acid content of which has been suitably adjusted, and from 0 to 10 mole percent, preferably not more than 5 mole percent, based on the total hydrolyzable silanes, of a compound of the kind embraced by Formula IV. If desired or deemed necessary, these compounds may be purified. The resulting mixture is then heated under reflux conditions.

The initially cloudy reaction mixture clears on heating, usually within an hour, because the hydroxyhydrocarbon by-product, specifically alcohol, dissolves the other components of the mixture. As previously has been stated, a suitable degree of hydrolysis-condensation is usually obtained if reflux is allowed to proceed for from about 1 to 4 hours after the mixture clears.

Other conditions with respect to the permissible acid content during the initial hydrolysis-concentration step, and concerning other influencing variables have been given hereinbefore.

In making methylpolysiloxanes referred to above, as well as, for instance, (methyl)(phenyl)polysiloxanes, some alkanol or other hydrolysis by-product should be retained, as previously indicated, in the reaction mass during hydrolysis and initial condensation for the reasons previously given. To avoid gelation and effect polysiloxane formation at a conveniently rapid rate, the acidity of the initial hydrolysis-condensation reaction mixture advantageously is suitably controlled. After initial hydrolysis and condensation controlled volatilization of hydrolysis by-products and water is effected, while the temperature of the mixture is raised to temperatures in the range of 100° to 300° C., thereby to precure the resin in the manner and for the reasons previously stated.

Other technique, including both composition and method features, for preparing an organopolysiloxane that advantageously can be modified with a rare-earth chelate, and the resulting composition utilized in the luminescent devices of the present invention, is described in the aforementioned Burzynski and Martin copending application Ser. No. 306,344 and which by this cross-reference is made a part of the disclosure of the instant application.

In the procedure of the invention of the aforementioned application Ser. No. 306,344 (hereafter often designated as the -344 application), usually a mixture which comprises a hydrolyzable methyltrialkoxysilane, a hydrolyzable phenyltrialkoxysilane, and water in a relative molar ratio of at most $x:y:1.5(x+y)$, respectively, wherein $x$ and $y$ are independently selected from the range of 1 to 10, inclusive, is heated at a temperature between ambient temperature and reflux temperature for a time of 1 to 10 hours; 50 to 90 mole percent of the alkanol by-product is removed by volatilization; the reaction mixture is heated to effect precure at a temperature within the range of up to 100 centigrade degrees above the boiling point of pure water at the prevailing pressure for a time up to 30 minutes; and the resinous mixture thus obtained is formed, usually by casting, and then cured for a time of at least 1 hour and up to 30 days at a temperature of from 1 centigrade degree to 60 centigrade degrees below the boiling point of pure water at the prevailing pressure to give a machinable, thermosetting, heat-resistant organopolysiloxane body.

The methyltrialkoxysilanes and phenyltrialkoxysilanes cited in the preceding paragraph refer to compounds of the formula $CH_3Si(OR)_3$ and $C_6H_5Si(OR)_3$, wherein R represents a monovalent alkyl radical of less than five (i.e., 1–4) carbon atoms. Examples of such methyltrialkoxysilanes are methyltrimethoxysilane, methyltriethoxysilane, methyltri(1-propoxy)silane, methyltri(2-propoxy)silane, methyltri(2 - methyl - 2 - propoxy)silane, methyltri(1-butoxy)silane, and methyltri(2-butoxy)silane; examples of phenyltrialkoxysilanes are phenyltrimethoxysilane, phenyltriethoxysilane, phenyltri(1-propoxy)silance, phenyltri(2-propoxy)silane, phenyltri(2-methyl-2-propoxy)silane, phenyltri(1-butoxy)silane, and phenyltri(2-butoxy)silane.

A further aspect of the invention of the -344 application that provides an especially heat-resistant, machinable, thermosetting organopolysiloxane body comprises heating a mixture which comprises a hydrolyzable methyltrialkoxysilane, a hydroyzable phenyltrialkoxysilane, and water in a relative molar ratio of at most $x:y:1.5(x+y)$, respectively, and advantageously a ratio of $x:y:3(x+y)$, respectively, wherein $x$ and $y$ are independently selected from the range of 1 to 10, inclusive, at a temperature between ambient temperature and 150° C. for a time of 1 to 10 hours; removing 50 to 90 mole percent of the alkanol by-product by volatilization; heating the reaction mixture to effect precure at a temperature within the range of from 5 centigrade degrees up to 110 centigrade degrees above the boiling point of pure water at the prevailing pressure, but usually not above 250° C., for a time up to 30 minutes; casting and then curing the resinous mixture thus obtained for at least one day at a temperature within 10 centigrade degrees below the boiling point of pure water at the prevailing pressure, then at a temperature increasing continually up to a maximum of up to 350° C. over a period of from 2 to 30 days, and finally allowing the sample to return slowly to ambient temperature over a time of from 1 to 12 hours.

A preferred procedure of the invention of the -344 application comprises heating at reflux temperature, for from 2 to 4 hours, a reaction mixture which comprises methyltriethoxysilane, phenyltriethoxysilane, and water in a relative molar ratio of at most $x:y:1.5(x+y)$, respectively, and advantageously a ratio of $x:y:3(x+y)$, respectively; in other words, on a molar basis the ratio of water to the sum of $x+y$ is a minimum of 1:5 and advantageously is 3. The values $x$ and $y$ are independently selected from the range of 1 to 5, inclusive. Additional steps in the preferred procedure include distilling 70 to 80 mole percent of 95% ethanol by-product from the reaction mixture, subjecting the distillation residue to a precure at 110° to 200° C. for a time up to 10 minutes at ambient pressure; and finally casting and then curing the resulting resinous mixture at 25° to 95° C. and at about atmospheric pressure for a time of from one day to one week to give a machinable, thermosetting, heat-resistant organopolysiloxane body.

The initial reaction mixture of the procedure of the -344 application optionally contains an acidic or basic catalyst, although the hydrolysis and subsequent condensation normally proceed at a convenient rate without them. To avoid premature gelation of the resins the quantity of acid or base in the reaction mixture must be below 0.01 mole of acid or base per mole of hydrolyzable silanol precursor. Similarly a solvent, e.g., ethanol, can be added to render the reaction mixture homogeneous.

The initial reaction mixture used in the invention of the -344 application also may contain precursors of methylsilanetriol and phenylsilanetriol in the above-defined ratios and 0 to 10 mole percent, usually 0 to 5 mole percent, of a co-reactant which, when present, usually comprises at least 1 mole percent of the mixture. (The aforementioned mole percentages are based on the hydrolyzable silane components of the initial mixture.) The aforesaid co-reactant comprises at least one compound of the formula V 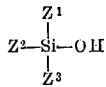

wherein $Z^1$, $Z^2$ and $Z^3$ represent monovalent hydrocarbon radicals independently selected from the group consisting of aryl, alkyl (including cycloalkyl) and alkenyl radicals, each of which contains less than 7 (i.e., 1–6) carbon atoms, and the hydroxyl radical. Examples of such co-reactants are trimethylsilanol, tri(1-methylethyl)silanol, trihexylsilanol, di(1-methylpropyl)silanediol, divinylsilanediol, diphenylsilanediol, propylpentylsilanediol, methylallylsilanediol, vinylphenylsilanediol, ethylsilanetriol, 1-methylethylsilanetriol, 1,1-dimethylethylsilanetriol, 2-2-dimethylpropylsilanetriol, hexylsilanetriol, and vinylsilanetriol. These co-reactants can be added to the reaction mixture in the form of their precursors of the formula VI 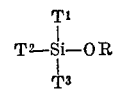

wherein $T^1$, $T^2$ and $T^3$ represent monovalent hydrocarbon radicals independently selected from the group consisting of aryl, alkyl (including cycloalkyl) and alkenyl radicals, each of which contains less than 7 carbon atoms, and the alkoxy radical RO—, wherein R has the meaning previously defined. Examples of such precursors are trimethylmethoxysilane, tri(1 - methylethyl)ethoxysilane, trihexyl(1,1 - dimethylethoxy)silane, tricyclopentylmethoxysilane, di(1-methylpropyl)diethoxysilane, divinyldipropoxysilane, diphenyldiethoxysilane, propylpentylmethoxyethoxysilane, methylallyldi(1 - methylethoxy)silane, vinylphenyldimethoxysilane, ethyltriethoxysilane, (1-methylethyl)trimethoxysilane, (1,1 - dimethylethyl)tripropoxysilane, (2,2 - dimethylpropyl)tributoxysilane, hexyltriethoxysilane, and vinyltriethoxysilane.

A further variation in the procedure of the invention of the -344 application can be achieved by hydrolyzing individually a hydrolyzable methyltrialkoxysilane and a hydrolyzable phenyltrialkoxysilane, and then combining the resulting organopolysiloxanes to form the initial reaction mixture described above. The resulting resinous mixture ultimately yields, by the method described, a machinable, thermosetting, heat-resistant organopolysiloxane body.

Products of the invention of the -344 application and luminescent, specifically fluorescent, modifications of which can be utilized in producing the luminescent devices of the instant invention are machinable, heat-resistant bodies camprising or consisting essentially of the siloxane condensation product of methylsilanetriol and phenylsilanetriol, in a molar ratio of from 1:10 to 10:1 (preferably from 1:5 to 5:1), respectively, and into which also may be incorporated, e.g., by co-condensation of the later-named diol with the methylsilanetriol and phenylsilanetriol, from 0 to 10 (preferably from 0 to 5) mole percent of the siloxane condensation product of diphenylsilanediol.

It will be understood, of course, by those skilled in the art that the silanols mentioned in the preceding paragraph, as well as the foregoing and others set forth elsewhere in the specification and in the appended claims, need not be preformed in making the siloxane condensation product. The aforementioned silanols employed therefore include both those which can be preformed (that is, prepared and isolated prior to undergoing a condensation reaction to form an organopolysiloxane) as well as those which are transitory (that is, incapable of being isolated in pure or substantially pure form as such before condensing to form siloxane linkages).

The chelate modifier

The metallic chelates, preferably rare-earth chelates (i.e., chelates of a rare-earth metal), used in modifying an organopolysiloxane to produce a modified organopolysiloxane that is utilized in accordance with the present invention are compounds composed of a chelating (chelate-forming) structure which contains at least two donor groups so located with respect to one another that they are capable of forming a chelate ring (normally of five or six members) with a rare-earth metal. The donor groups are well known and recognized by those skilled in the art of chelate chemistry. See, for example, the following literature references concerning chelate chemistry and lists of principal donor groups: "The Chelate Rings," by H. Diehl, "Chemical Reviews," 21, 39–111 (1937); and "Chemistry of the Metal Chelate Compounds," by Martell and Calvin, published in 1952 by Prentice-Hall, Inc., New York, N.Y. (1952). It might here also be mentioned that, in chelate-chemistry language, organic compounds containing the aforementioned chelating structures are often designated as "ligands;" and organic compounds having at least two ligand functions (i.e., at least two chelating structures) are often termed "polyligands." The aforementioned donor groups, and hence the chelate-forming structures or ligands therefrom, contain many different donor atoms among which may be mentioned by way of example oxygen, sulfur and nitrogen atoms. Optimum results in the utilization of the compositions employed in practicing the present invention have been obtained when the donor atom is an oxygen or a sulfur atom.

The rare-earth chelate that is used is preferably, but not necessarily, a chelate of a rare-earth metal and a "volatile chelating agent"; and by which latter term is meant more particularly an organic compound that can be vaporized (volatilized) with little or no decomposition. When the chelating agent is a ketone embraced by Formula II, one may advantageously use those boiling below about 300° C. at 760 mm. pressure, although the use of chelating agents boiling above this temperature is not precluded.

As indicated in the fourth paragraph of this specification, the preferred chelating agent is a ketone embraced by Formula II, that is, one represented by the general formula

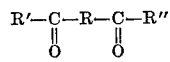

where R, R' and R" have the meanings given in said paragraph.

Illustrative examples of divalent radicals having from 1 to 3 carbon atoms, inclusive, that are represented by R in Formula II are divalent aliphatic hydrocarbon radicals, having from 1 through 3 carbon atoms, e.g., alkylenes such as methylene, ethylene, propylene and isopropylene; and alkenylenes such as ethylenylene, propenylene and isopropenylene.

Illustrative examples of radicals represented by R' and R" in Formula II are the monovalent hydrocarbon, halohydrocarbon, oxyhydrocarbon and thiohydrocarbon radicals containing from 1 to 12 carbon atoms, inclusive. More specific examples of such radicals are aliphatic (including cycloaliphatic), aromatic-substituted aliphatic, aromatic, and aliphatic-substituted aromatic hydrocarbon radicals having from 1 through 12 carbon atoms such as alkyl, e.g., methyl, ethyl and propyl through dodecyl (both normal and isomeric forms), cyclopentyl, cyclohexyl, cycloheptyl, etc.; alkenyl, e.g., ethenyl, propenyl and other alkenyl radicals corresponding to the aforementioned alkyl radicals; aralkyl, e.g., benzyl, phenylethyl, phenylpropyl, etc.; aryl, e.g., phenyl, biphenylyl, naphthyl, etc.; alkaryl, e.g., tolyl, xylyl, diethylphenyl, dipropylphenyl, butylphenyl, etc.; the corresponding chlorinated, brominated and fluorinated derivatives (mono- through perhalogenated in the linear chain and/or in the aromatic nucleus); and the corresponding oxy and thio derivatives wherein one or more oxygen and/or sulfur atoms are positioned between carbon atoms in a linear chain and/or an aromatic ring. For instance R' and/or R" in Formula II may be alkoxyalkyl (e.g., methoxymethyl, -ethyl, -propyl, -butyl, -pentyl and -hexyl) or the corresponding thio derivatives; the methoxy- through pentoxyphenyls or the corresponding thio derivatives; or heterocyclic compounds containing one or more oxygen or sulfur atoms in the ring, e.g., thienyl, furyl and the like.

The chelating agents employed in the preparation of the rare-earth acylacetonates and other rare-earth chelates are those which are most readily available at minimum cost. Examples of classes of such chelating agents are the 1,3-diketones of which the diketones embraced by Formula II are a preferred subclass, the β-ketoesters and the aromatic o-hydroxyaldehydes and esters. More specific examples of such chelating agents including those embraced by Formula II as well as of others outside the scope of this formula are acetylacetone, propionylacetone, butyrylacetone, valerylacetone, caproylacetone, caprylylacetone, benzoylacetone (1-phenyl-1,3-butanedione), 3-methyl-2,4-pentanedione, 3-ethyl - 2,4 - pentanedione, trifluoroacetylacetone, 2-thenoylacetone, 2-thenoyltrifluoroacetone, 2-furoylacetone, 2-furoyltrifluoroacetone, ethyl through heptyl acetoacetates, salicylaldehyde, methyl salicylate, ethyl salicylate and others that will be apparent to those skilled in the art from the foregoing illustrative examples.

The metal that is chelated with such chelating agents, and which preferably contains no nitrogen donor atom(s), may be any of the rare-earth metals. The chelate of yttrium also may be used in modifying an organopolysiloxane to produce compositions of this invention. Although yttrium is not classified among the rare-earth elements in Mendeleev's Table of the Periodic Arrangement of the Elements, it functions in the same way as do those rare-earth elements listed in said table. Hence those skilled in the art presently consider yttrium among the rare-earth elements, and this is the classification given it in this specification.

Preparation of rare-earth chelates

Variouse methods for the preparation of most of the rare-earth chelates are described in the prior art. See, for example, the following literature citations: "Intramolecular Energy Transfer in Rare Earth Chelates. Role of the Triplet State," by Crosby et al., "The Journal of Chemical Physics," 34, 3, 743 (March 1961); "Spectroscopic Studies of Rare Earth Chelates," by Crosby et al., "Journal of Physical Chemistry," 66, 2493 (December 1962); "Fluorescence and Lifetimes of Eu Chelates," by Samelson et al., "The journal of Chemical Physics," 39, 1, 110 (July 1, 1963); and "Fluorescence of Europium Thenoyltrifluoroacetonate. I. Evaluation of Lasser Threshold Parameters," by Winston et al., "The Journal of Chemical Physics," 39, 2, 267 (July 15, 1963). Reference is also made to the description under this same heading in the aforementioned Newing, Jr., copending application Ser. No. 418,531, now U.S. Patent No. 3,367,910 and the specific preparations given under Examples 1 through 8, 13–A and 14–A of that application.

Incorporation of a chelate into an organopolysiloxane

Any suitable technique may be used in incorporating a chelate, more particularly a metallic chelate and still more particularly a rare-earth chelate, into the organopolysiloxane. In some instances it may be advantageous to admix the chelate with the silanol(s) and/or precursor(s) of silanol(s) prior to hydrolysis (if a precursor or precursors are employed) and condensation to an organopolysiloxane.

The chelate may be admixed with liquid, semi-solid or solid organopolysiloxanes at any stage of their preparation or after the organopolysiloxane has been formed, the exact point of admixture depending upon such influencing factors as, for example, the ultimate physical state or form of the organopolysiloxane and the use to which the chelate-modified organopolysiloxane is to be placed. For instance, if the organopolysiloxane is normally a liquid, the chelate may be incorporated into the crude (i.e., impure) organopolysiloxane if the latter is to be modified and employed without further purification prior to use; or the chelate may be admixed with the purified organopolysiloxane fraction of the desired B.P. or boiling range. In the case of semi-solid organopolysiloxanes such as those in the form of greases the chelate may be admixed with the organopolysiloxane during or after its conversion to a semi-solid (e.g., grease or grease-like consistency).

The preferred method of incorporating a chelate such as a rare-earth chelate into an organopolysiloxane, more particularly a curable (e.g., heat-curable) organopolysiloxane, comprises partly curing a curable organopolysiloxane; forming a homogeneous admixture of (a) the partly cured organopolysiloxane in liquid state and (b) a solvent solution of a rare-earth chelate (numerous examples of which have been given hereinbefore); and completing the cure of the partly cured organopolysiloxane in the presence of the said chelate. The preferred organopolysiloxane comprises or consists essentially of the siloxane condensation product of hydrolyzable silane including at least one compound represented by Formula I. The reference above to the "liquid state" of such organopolysiloxanes means that they may be liquid in the absence of a solvent or that they may be dissolved or dispersed in a solvent to form a liquid composition.

The preferred modifier of the organopolysiloxane is a rare-earth chelate of a ketone represented by Formula I.

The amount of rare-earth chelate which is incorporated into the organopolysiloxane may be widely varied as desired or as conditions may require. For instance, depending upon such influencing factors as, for example, the chosen rare-earth chelate and the intended use of the chelate-modified organopolysiloxane, it may be as little as, for example, a trace amount of chelate (that is, an amount ranging from, for instance, 1 to 200 parts of chelate, calculated as rare-earth metal, per million parts of organopolysiloxane) up to a molar ratio of chelate to organopolysiloxane of 1 to about 20, respectively, more particularly from 1 to about 50, respectively, and still more particularly from 1 to about 100, respectively, calculated as rare-earth metal (M) to Si. Usually the molar ratio of M:Si ranges between 1:100 and 1:2000, respectively, e.g., 1:1000 $\mp$500, respectively. No particular advantages seemingly accrue from using more rare-earth chelate than is necessary to impart the desired properties, particularly luminescence and specifically U.V. fluorescence, to the organopolysiloxane.

The preferred organopolysiloxanes employed in producing the compositions utilized in practicing this invention are those prepared as previously has been described and into which the rare-earth chelate has been incorporated by the above-described preferred technique. Further processing of the chelated-modified, partly cured (i.e., precured) organopolysiloxane is essentially the same as set forth in the aforementioned Burzynski and Martin copending applications Ser. Nos. 306,344 and 370,684, and Newing, Jr., copending application Ser. No. 418,531 now U.S. Patent No. 3,367,910. For instance, modifiers in addition to a rare-earth chelate, and which are substantially chemically inert during the further curing conditions employed, can be added to the organopolysiloxane to obtain desired variations in properties. Coloring agents such as alcohol- or water-soluble dyes or insoluble pigments can be incorporated into the chelate-modified organopolysiloxane to give luminescent compositions or bodies of the kind herein described and which are also colored.

After casting or otherwise shaping in mold, or after deposition as a coating on a substrate, or other similar or equivalent action, the chelate-modified organopolysiloxane resin is cured. Cross-linking and some linear polymerization probably proceed at this stage since the resin becomes increasingly hard.

Taking as an example the production of a cast resin to obtain a hard, machinable, luminescent, heat-resistant body, the final cure of such a resin can be carried out, if desired, at room temperature (20°–30° C.) or lower merely by allowing the cast resin to remain undisturbed. Although the final cure may be effected without added heat, a more convenient procedure involves heating the chelated-modified, precured, organopolysiloxane resin at about 90° C. for varying time intervals, e.g., for from about 1 to 3 days, or sometimes longer, for instance up to 7 days. The final stages of cure can also be carried out at temperatures above 100° C. after a cure at 90° C. has brought the resin to a substantailly hard condition.

Additional details of precuring and curing conditions are given in some of the examples which follow.

The luminescent, specifically fluorescent, resinous product of the precure step is soluble in water-miscible organic solvents such as alkanols (e.g., methanol through pentanol), ketones (e.g., acetone, methyl ethyl ketone, etc.), ethers (e.g., glycol monoethyl ether, tetrahydrofuran, etc.), as well as many other common organic solvents. The resulting solutions, which can be used as liquid targets in a luminescent device, have prolonged storage life before gelation occurs, and their stability increases with decreasing temperature and resin concentration.

A lower limit for resin concentration is set only by convenience, since storage and subsequent removal of solvent from extremely dilute solutions is generally commercially unfavorable. These dilute solutions, usually containing about 50 weight percent of resin solids, can be evaporated to a more viscous stage and used as molding materials by the further curing steps already described. As previously indicated, they can also be used as fluorescent (including potentially fluorescent) film-forming materials, e.g., in coating applications, by spraying, brushing, or other means known to the art. The thickness of the resulting films can be controlled, of course, by varying the concentration of the resin solution and the number of layers applied. The coatings thereby obtained can be cured by heating, e.g., according to the curing process previously described for making a molded resin.

The above-described techniques for the preparation of solid, luminescent, organopolysiloxane bodies are, in general, also applicable to the formation of such films. The final, cured products are substantially solid and apparently possess a high degree of cross-linking, since they are substantially insoluble in solvents such as benzene and toluene.

In order that those skilled in the art may better understand how the present invention can be carried into effect, the following examples are given by way of illustration and not by way of limitation. All parts and percentages are by weight unless otherwise stated.

EXAMPLE 1

A. *Preparation of an organopolysiloxane.*—A 250-ml. three-necked flask is equipped with a thermometer, magnetic stirrer and condenser. The condenser is provided with a take-off to allow reflux or distillation. In the thusly-equipped flask is placed 94 ml. (0.5 mole) of methyltriethoxysilane, 60 ml. (0.25 mole) of phenyltriethoxysilane and 40.5 ml. (2.25 moles) of water. The resulting two-phase mixture is heated to about 80° C. After heating for about 5 minutes at this temperature a one-phase system is formed. This single-phase reaction mass is heated under reflux with stirring for 4 hours. At the end of this time about 80% of the theoretical amount of by-product ethanol has been recovered as a distillate. The residual liquid organopolysiloxane contains about 60% by weight of solids. The organopolysiloxane therein, which has an average molecular weight of about 86.5, may be represented by the formula $$[(CH_3)_{0.67}(C_6H_5)_{0.33}Si_{1.0}O_{1.5}]_n$$

The aforementioned residue of liquid organopolysiloxane resin is transferred to a 300-ml. beaker in which it is heated with stirring to 140° C. to effect precure. It is held only momentarily at 140° C. A clear, viscous, incompletely condensed resin results.

B. *Incorporation of* $Pr(TTA)_3$ *in an organopolysiloxane resin.*—To 74 grams of precured resin (about ½ mole prior to precure to 140° C.) dissolved in ethanol (50 ml.) and cooled to 75° C. is added 0.0005 mole (0.404 g.) of praseodymium thenoyltrifluoroacetonate, $Pr(TTA)_3$, dissolved in a small amount of ethanol. This is in a molar ratio of Si to Pr of approximately 1000:1.

The solutions are thoroughly mixed together to obtain a homogeneous liquid mass, after which a glass slide is dipped therein to provide a coating thereon. The mixture is then precured again by heating to 120° C. After this second precure a second glass slide is coated by dipping in the hot, liquid resin, and castings are made by pouring samples into small circular aluminum pans wherein discs are formed when the resin is fully cured.

The pans containing the precured chelate-modified organopolysiloxane resin and the coated glass slides are placed in a 90° C. oven for 48 hours. At the end of this period of time the coatings on the slides are hard and clear, as are also the cured discs. Both the coatings and the discs exhibit a weak but deep red fluorescence when exposed to U.V. light. A sample of $Pr(TTA)_3$ itself gives no visual indication of fluorescence upon exposure to U.V. light.

EXAMPLE 2

Example 1 is repeated using 0.0005 mole of lanthanum thenoyltrifluoroacetonate, $La(TTA)_3$, instead of 0.0005 mole of $Pr(TTA)_3$. The cured discs and coated glass slides fluoresce with a weak, light blue fluorescence when exposed to U.V. light. A sample of $La(TTA)_3$ itself has no obvious fluorescence when exposed to U.V. light.

EXAMPLE 3

Terbium thenoyltrifluoroacetonate, $Tb(TTA)_3$, 0.4 g., is added to 74 ml. (½ mole) of a liquid organopolysiloxane, prepared as described in Example 1–A prior to the precuring step. The mixture is precured by heating with stirring to 140° C., after which several castings are made in circular aluminum molds. Precuring and final curing at 90° C. are carried out as described in Example 1–B. The discs are hard, transparent and show bright green fluorescence when exposed to U.V. light.

EXAMPLE 4

Example 3 is repeated exactly using 0.4 g. of europium thenoyltrifluoroacetonate, $Eu(TTA)_3$, instead of 0.4 g. of $Tb(TTA)_3$. When exposed to U.V. light the discs are hard, transparent and show a bright orange-red fluorescence.

EXAMPLE 5

To 74 grams of precured resin (about ½ mole prior to precure to 140° C.) dissolved in ethanol (50 ml.) and cooled to 75° C. is added 0.0005 mole of $Eu(TTA)_3$, molecular weight 818.6, dissolved in a small amount of ethanol. This is a molar ratio of Si to Eu of approximately 1000:1.

The solutions are thoroughly mixed together to obtain a homogeneous liquid mass, after which a glass slide is dipped therein to provide a coating thereon. The mixture is then precured again by heating to 120° C. at which time a second glass slide is coated and two discs are cast and molded as described in Example 1–B.

At the end of the cure period all four samples (i.e., the two coated slides and the two discs) exhibit a high degree of orange-red fluorescence under U.V. light.

EXAMPLE 6

Same as in Example 5 with the exception that 0.0005 mole of $Tb(TTA)_3$ is used instead of 0.0005 mole of $Eu(TTA)_3$. The glass slides coated with the cured, chelate-modified, organopolysiloxane resin of this example, as well as the cured molded discs made from the same modified resin, are hard, transparent and quite fluorescent (green) at room temperature (20°–30° C.). In marked contrast, $Tb(TTA)_3$ itself is fluorescent only at very low temperatures of the order of −196° C. This would indicate that the matrix is providing an unobvious action and that solid solution of the chelate in the matrix occurs.

Referring now to the accompanying drawing, FIGURE 1 illustrates schematically a luminescent device of the present invention, more particularly a fluorometer. Such instruments require a fluorescent standard whereby calibration can be obtained in a frequency near that of the fluorescence of the standard.

In the drawing 10 represents a source of energizing rays, e.g., a U.V. lamp. A filter for filtering out rays that are not wanted is indicated at 12. Mirrors are shown at 14, 16, 18, 20, 22 and 24. A fluorescent standard, viz., a modified organopolysiloxane, more particularly a solid organopolysiloxane modified with a rare-earth chelate such as has been described hereinbefore, is indicated at 26, while the fluorescent sample to be tested is shown at 28. The rays reflected from the mirrors 22 and 24 are directed toward the chopper 30, which is a device for giving equal times to two optical paths. One-half of this chopper, which is driven by motor 32, is mirrored while the other half is plain glass. The light passing through the chopper strikes the phototube 34 to which is connected the recording chart 36 upon which values obtained by the phototube are recorded. Instead of using a recording chart, the phototube may be connected to a potentiometer from which readings are taken.

As illustrative of another type of luminescent device embodied by the instant invention, there is shown schematically in FIGURE 2 an electronic tube and, more particularly, a cathode-ray tube. In this figure the electronic tube, specifically an evacuated, demountable cathode-ray tube 38, is provided with a glass faceplate 40 having on its inner surface a thin film 42 of an organopolysiloxane resin having incorporated therein a soluble, luminescent (including potentially luminescent) organic-inorganic compound, more particularly an organometallic compound, a subclass of which comprises the metallic chelates including the chelates of the transition metals and the rare-earth metals. An electron gun and associated electrical components are indicated at 44.

The cathodoluminescent organopolysiloxane film, such as indicated at 42, can be used to cover large areas of a glass faceplate, such as indicated at 40, and thus provides an easy method of producing large, transparent screens. The "phosphor"-type of material produced by incorporating a soluble, cathodoluminescent compound into an organopolysiloxane yields a rugged, easily-deposited, luminescent film. Resins that can withstand electron bombardment are rare, but the solid organopolysiloxane resins that are modified and used in the luminescent devices of the instant invention do have this unusual property. Metal chelates, especially the rare-earth chelates, are also substantially stable materials and can have low vapor pressures. The combination of these individual properties in a new and unobvious relationship make possible the production of an organopolysiloxane "phosphor"-type of screen. Example 7, which follows, illustrates this embodiment of the invention.

EXAMPLE 7

A fluorescent and cathodoluminescent organopolysiloxane was made by dissolving a metallic chelate, more particularly a chelate of a rare-earth metal, and still more particularly a chelate or europium, specifically an acylacetonate, and still more specifically a benzoylacetonate of europium, into a solvent solution, specifically an acetone solution, of an organopolysiloxane, more particularly an organopolysiloxane of the kind produced as described under Example 1–A. The resulting solution was air-dried for about 16 hours at room temperature (about 20°–30° C.) on a glass plate and baked under an infrared lamp. The cured resin was brightly red fluorescent under U.V. excitation. The resin film was coated with a composition comprising a finely divided electrical conductor, specifically finely divided graphite, to make a conductive film, then placed in a demountable cathode-ray tube and pumped down to $5$–$10^{-6}$ mm. Hg pressure. Instead of finely divided graphite, any other electrical conductor may be used.

The cured film was bombarded with a 10KV electron beam whereupon the film became brightly cathodoluminescent. The spectral output was about the same as when the film was excited by ultraviolet light, and was characteristic of trivalent europium.

In a manner similar to that described under Example 7 two glass plates were individually coated with an organopolysiloxane resin prepared as described under Example 1–A and into individual portions of which had been incorporated a small amount of the thenoyltrifluoroacetonate of (a) terbium and (b) europium. The cured films on the plates were given a conductive coating of graphite as above described, and then subjected to bombardment with electrons in the aforementioned cathode-ray tube whereupon, in each case, a bright fluorescence was exhibited.

Another glass plate was coated with a europium thenoyltrifluoroacetonate - modified organopolysiloxane prepared as described under Example 1–A. The coating was spray-deposited using a Freon® propellant and an atomizer. Instead of coating the cured films with an electrically conducting composition comprising finely divided graphite as in the previous tests, a composition comprising finely divided aluminum was used. When the resulting coated film was bombarded with electrons in the above-described cathode-ray tube, a bright fluorescent characteristic of the tri-positive europium ion was observed. No decomposition of the resin film during bombardment was apparent.

Tests with another coating of an organopolysiloxane resin prepared as described under Example 1–A and modified with a small amount of a different europium compound, which coating had been spray-deposited on a glass plate and aluminum coated as described in the preceding paragraph, exhibited a rather different behavior. The initial light output upon electron bombardment was a very weak blue, but after less than a minute the light output increased and became a greenish white. This light output was fairly constant for about 5 minutes, although it did decrease somewhat. After removal from the cathode-ray tube the coated plate showed a pronounced fluorescence where the electron beam had struck. It would appear, therefore, that a new fluorescent material was created under bombardment with electrons, possibly as a result of interaction between the electrons and the europium compound held in a matrix of organopolysiloxane. In marked contrast, the similarly-prepared coating of thenoyltrifluoroacetonate-modified organopolysiloxane (see the preceding paragraph) showed an irreversible decay in its fluorescence under bombardment with electrons.

The thin, transparent, cathodoluminescent screens, produced as above described, using modified organic-inorganic materials, more particularly modified organopolysiloxanes, provide means for making a wide variety of luminescent devices. In the design and construction of such devices one can take advantage of the variety of responses to electron bombardment that are obtainable, as indicated by the test results set forth in the preceding paragraph.

It will be understood, of course, by those skilled in the art that the present invention is not limited only to the particular devices and components thereof described hereinbefore and illustrated in the accompanying drawing. Thus, instead of using targets comprising the compositions described in Examples 1 through 6, one may use other organopolysiloxanes modified with other organic-inorganic substances capable of luminescent emission under irradiation or bombardment with electrons. For example, instead of the specific rare-earth chelates and the specific organopolysiloxanes employed in the individual examples one may use any other rare-earth chelate or any other organopolysiloxane. Illustrative examples of other organopolysiloxanes that may be modified as herein described and the resulting compositions utilized in making luminescent devices of the present invention are described in the prior patent art, e.g., U.S. Patents 2,258,-218–222 (Rochow); 2,449,572 (Welsh); 2,759,904 (Talcott); 2,855,380 (Hedlund); and in hundreds of other patents that have issued since the aforementioned Rochow patents. As previously mentioned, the preferred organopolysiloxanes are those broadly described in the second paragraph of this specification and more specifically elsewhere herein.

I claim:

1. A luminescent device having a source of energizing rays and a target for conversion of said rays to luminescent emission, said target comprising a luminescent material consisting essentially of an organopolysiloxane having incorporated therein a rare-earth chelate, the chelate being in an amount effective to impart luminescence to the organopolysiloxane under the action of the said energizing rays.

2. A luminescent device as in claim 1 wherein the organopolysiloxane comprises the siloxane condensation product of the hydrolysis product of at least one hydrolyzable silane represented by the general formula $$T_nSiZ_{(4-n)}$$

wherein each T independently represents a member of the group consisting of alkyl, alkenyl and aryl radicals having less than 7 carbon atoms, each Z independently represents a hydrolyzable group, and $n$ represents a positive integer less than 4.

3. A luminescent device as in claim 1 wherein the rare-earth chelate is a rare-earth chelate of a ketone represented by the general formula

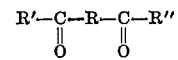

wherein R represents a divalent aliphatic hydrocarbon radical having from 1 to 3 carbon atoms, inclusive, R' represents a monovalent radical selected from the group consisting of monovalent hydrocarbon, halohydrocarbon, oxyhydrocarbon and thiohydrocarbon radicals having from 1 to 12 carbon atoms, inclusive, and R" has the same meaning as R' and, in addition, a hydrogen atom.

4. A luminescent device as in claim 3 wherein the rare-earth chelate is a chelate of europium.

5. A luminescent device as in claim 3 wherein the rare-earth chelate is a rare-earth acylacetonate.

6. A luminescent device as in claim 5 wherein the rare-earth chelate is europium benzoylacetonate.

7. A luminescent device having a source of energizing rays and a target for conversion of said rays to luminescent emission, said target comprising a luminescent material consisting essentially of a major amount of, by weight, an organopolysiloxane which is the siloxane condensation product of the hydrolysis product of water and at least one hydrolyzable silane represented by the general formula $$T_nSiZ_{(4-n)}$$

wherein each T independently represents a member of the group consisting of alkyl, alkenyl and aryl radicals having less than 7 carbon atoms, each Z independently represents a hydrolyzable group, and $n$ represents a positive integer less than 4, the amount of water being at least 1.5 moles per mole of total silane present; said organopolysiloxane having incorporated therein a minor amount of, by weight, a rare-earth chelate of a ketone represented by the general formula

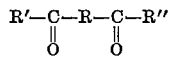

wherein R represents a divalent aliphatic hydrocarbon radical having from 1 to 3 carbon atoms, inclusive, R' represents a monovalent radical selected from the group consisting of monovalent hydrocarbon, halohydrocarbon, oxyhydrocarbon and thiohydrocarbon radicals having from 1 to 12 carbon atoms, inclusive, and R'' has the same meaning as R' and, in addition, a hydrogen atom, the chelate being in an amount effective to impart luminescence to the organopolysiloxane under the action of the said energizing rays.

8. A luminescent device having a source of energizing rays and a target for conversion of said rays to luminescent emission, said target comprising a luminescent material which is a solid, machinable composition consisting essentially of, by weight, a major amount of (I) the siloxane condensation product of (A) a silanetriol including methylsilanetriol and (B) from 0 to 10 mole percent, based on the total silanol reactants, of a compound represented by the general formula

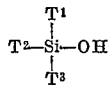

wherein $T^1$, $T^2$, $T^3$ each represent a monovalent radical independently selected from the group consisting of alkyl, alkenyl and aryl radicals having less than 7 carbon atoms, and the hydroxyl radical, and a minor amount of (II) a rare-earth chelate of a ketone represented by the general formula

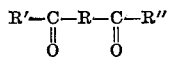

wherein R represents a divalent aliphatic hydrocarbon radical having from 1 to 3 carbon atoms, inclusive, R' represents a monovalent radical selected from the group consisting of monovalent hydrocarbon, halohydrocarbon, oxyhydrocarbon and thiohydrocarbon radicals having from 1 to 12 carbon atoms, inclusive, and R'' has the same meaning as R' and, in addition, a hydrogen atom, the chelate of (II) and the amount thereof being effective in imparting luminescence to the siloxane condensation product of (I) under the action of the said energizing rays.

9. A luminescent device as in claim 8 wherein the silanetriol of (A) includes both methylsilanetriol and phenylsilanetriol in a molar ratio of 1:10 to 10:1.

10. A luminescent device as in claim 8 wherein the rare-earth chelate of (II) is a chelate of europium.

11. A luminescent device as in claim 8 wherein the rare-earth chelate of (II) is a rare-earth benzoylacetonate.

12. An electronic image-forming device including a tube having a faceplate at least a portion of the inner surface of which is surfaced with a composition consisting essentially of an organopolysiloxane having incorporated therein a soluble organometallic substance capable of luminescence upon bombardment with electrons.

13. An electronic image-forming device as in claim 12 wherein the soluble, organometallic substance is a soluble, rare-earth chelate capable of luminescence upon bombardment with electrons.

14. A cathode-ray tube having a faceplate at least a portion of the inner surface of which is coated with a thin film of an organopolysiloxane having a rare-earth chelate incorporated therein, said organopolysiloxane being the siloxane condensation product of the hydrolysis product of water and at least one hydrolyzable silane represented by the general formula

wherein each T independently represents a member of the group consisting of alkyl, alkenyl and aryl radicals having less than 7 carbon atoms, each Z independently represents a hydrolyzable group, and $n$ represents a positive integer less than 4, the amount of water being at least 1.5 mole per mole of total silane present.

15. A cathode-ray tube as in claim 14 wherein the rare-earth chelate is a rare-earth chelate of a ketone represented by the general formula

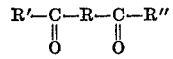

wherein R represents a divalent aliphatic hydrocarbon radical having from 1 to 3 carbon atoms, inclusive and R' represents a monovalent radical selected from the group consisting of monovalent hydrocarbon, halohydrocarbon, oxyhydrocarbon and thiohydrocarbon radicals having from 1 to 12 carbon atoms, inclusive, and R'' has the same meaning as R' and, in addition, a hydrogen atom.

16. A cathode-ray tube as in claim 15 wherein the rare-earth chelate is europium benzoylacetonate.

17. A cathode-ray tube having a faceplate at least a portion of the inner surface of which is coated with a thin film of a composition consisting essentially of an organopolysiloxane having a rare-earth chelate incorporated therein, said film being capable of luminescent emission under the influence of energizing rays; and means for supplying energizing rays to said film.

18. A luminescent screen in the form of a glass base plate, and a transparent film overlying said base plate, said film consisting essentially of an organopolysiloxane having incorporated therein a soluble organometallic substance capable of luminescence under the action of energizing rays.

19. A luminescent screen in the form of a glass base plate, and a transparent film overlying said base plate, said film consisting essentially of an organopolysiloxane having a rare-earth chelate incorporated therein, said organopolysiloxane being the siloxane condensation product of the hydrolysis product of water and at least one hydrolyzable silane represented by the general formula

wherein each T independently represents a member of the group consisting of alkyl, alkenyl and aryl radicals having less than 7 carbon atoms, each Z independently represents a hydrolyzable group, and $n$ represents a positive integer less than 4, the amount of water being at least 1.5 moles per mole of total silane present.

20. A process for generating luminescent emission which comprises causing energizing radiation to impinge on a target capable of luminescent emission under the influence of energizing rays and comprising an organopolysiloxane having incorporated therein a rare-earth chelate.

References Cited

UNITED STATES PATENTS

| | | | |
|---|---|---|---|
| 3,367,910 | 2/1968 | Newing | 252—301.2 |
| 3,398,099 | 8/1968 | Kleinerman | 252—301.2 |

FOREIGN PATENTS

| | | |
|---|---|---|
| 1,318,799 | 1/1963 | France. |

OTHER REFERENCES

Kleinerman et al.: Journal of Chemical Physics, vol. 41, No. 12, Dec. 15, 1964, pp. 4009–10.

TOBIAS E. LEVOW, Primary Examiner

R. D. EDMONDS, Assistant Examiner

U.S. Cl. X.R.

252—301.2; 313—109